United States Patent
Kitano et al.

(10) Patent No.: US 12,465,302 B2
(45) Date of Patent: Nov. 11, 2025

(54) RADIATION DETECTOR AND CONTROL METHOD

(71) Applicant: FUJIFILM CORPORATION, Tokyo (JP)

(72) Inventors: Koichi Kitano, Kanagawa (JP); Kentaro Noma, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 318 days.

(21) Appl. No.: 18/303,487

(22) Filed: Apr. 19, 2023

(65) Prior Publication Data

US 2023/0255577 A1    Aug. 17, 2023

Related U.S. Application Data

(63) Continuation of application No. PCT/JP2021/038806, filed on Oct. 20, 2021.

(30) Foreign Application Priority Data

Oct. 30, 2020    (JP) ................................. 2020-183114

(51) Int. Cl.
*A61B 6/00* (2024.01)
*A61B 6/42* (2024.01)

(52) U.S. Cl.
CPC .............. *A61B 6/4208* (2013.01); *A61B 6/56* (2013.01); *A61B 6/44* (2013.01)

(58) Field of Classification Search
CPC ........... A61B 6/4208; A61B 6/56; A61B 6/44; A61B 6/548; A61B 6/4233; Y02D 30/70;
(Continued)

(56) References Cited

U.S. PATENT DOCUMENTS

2011/0317809 A1* 12/2011 Eguchi ................. A61B 6/4283
378/101
2012/0042372 A1*  2/2012 Ellis .................... G06F 11/2035
726/11
(Continued)

FOREIGN PATENT DOCUMENTS

JP        2003-319908 A     11/2003
JP        2003-334185 A     11/2003
(Continued)

OTHER PUBLICATIONS

International Search Report issued in International Application No. PCT/JP2021/038806 on Jan. 18, 2022.
(Continued)

*Primary Examiner* — David J Makiya
*Assistant Examiner* — Mamadou Faye
(74) *Attorney, Agent, or Firm* — SOLARIS Intellectual Property Group, PLLC

(57) ABSTRACT

There is provided a radiation detector including: a radiation detection unit that generates and outputs a radiation image from an electric charge generated in response to emitted radiation; and a communication unit that operates as a master to perform wireless communication with a slave and that is prevented from being directly connected to a global network, in a case of transmitting the radiation image generated by the radiation detection unit.

6 Claims, 3 Drawing Sheets

(58) Field of Classification Search
CPC ........ G01T 7/00; H04W 52/02; H04W 84/10; H04W 84/20
See application file for complete search history.

(56) References Cited

U.S. PATENT DOCUMENTS

| | | |
|---|---|---|
| 2014/0085666 A1 | 3/2014 | Park |
| 2014/0359752 A1* | 12/2014 | Swaminathan ........ G06Q 10/06 726/16 |
| 2016/0287204 A1 | 10/2016 | Nishii |
| 2016/0358458 A1 | 12/2016 | Kudo |
| 2018/0317874 A1 | 11/2018 | Kudou |
| 2019/0167215 A1* | 6/2019 | Kim ........................ A61B 6/00 |
| 2019/0230724 A1 | 7/2019 | Kuwata et al. |

FOREIGN PATENT DOCUMENTS

| | | |
|---|---|---|
| JP | 2012-100796 A | 5/2012 |
| JP | 2016-189968 A | 11/2016 |
| JP | 2017-000233 A | 1/2017 |
| JP | 2019-126539 A | 8/2019 |
| JP | 2020-58789 A | 4/2020 |

OTHER PUBLICATIONS

Written Opinion of the ISA issued in International Application No. PCT/JP2021/038806 on Jan. 18, 2022.
English language translation of the following: Office action dated Aug. 26, 2025 from the JPO in a Japanese patent application No. 2022-559057 corresponding to the instant patent application.

\* cited by examiner

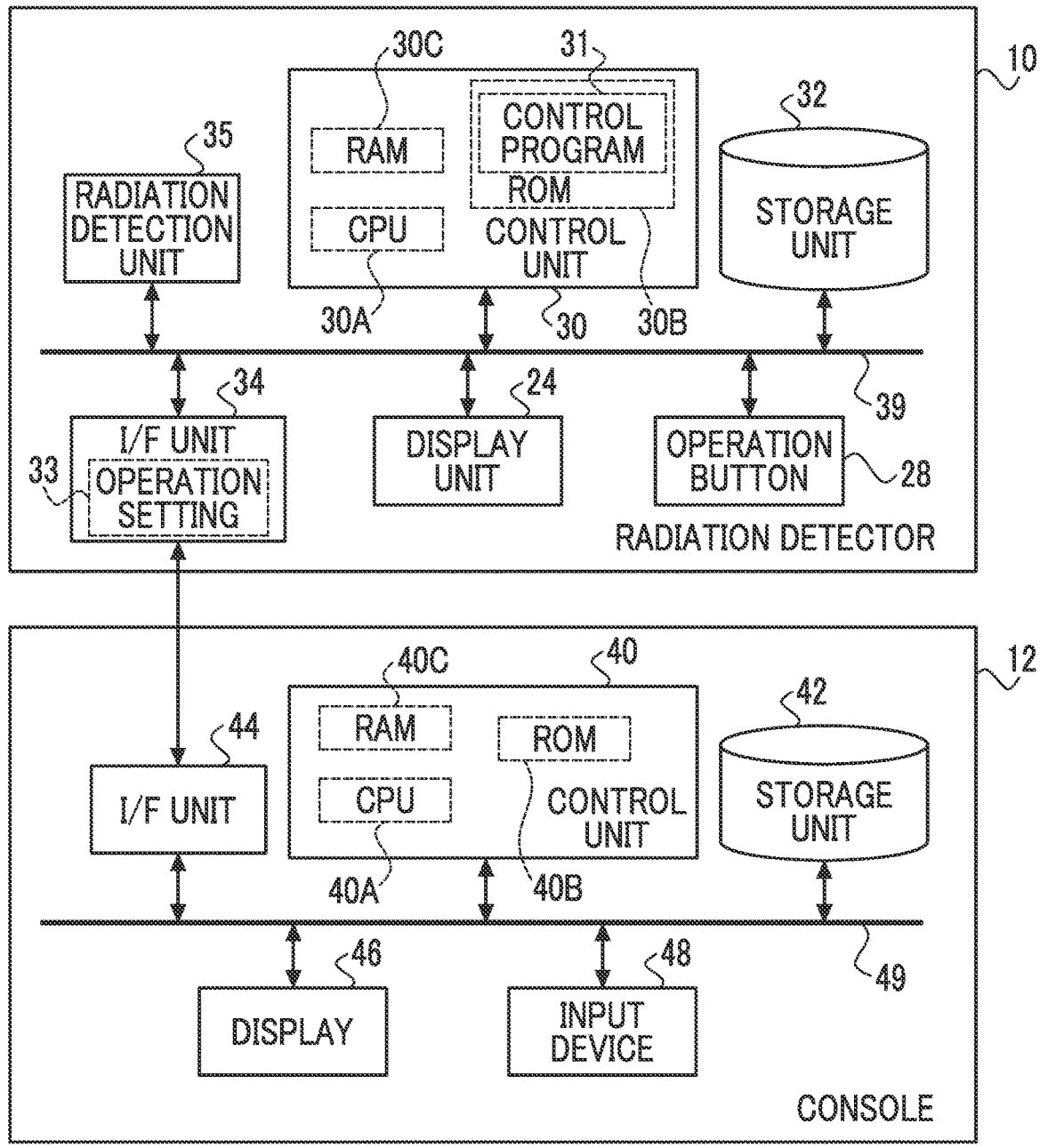
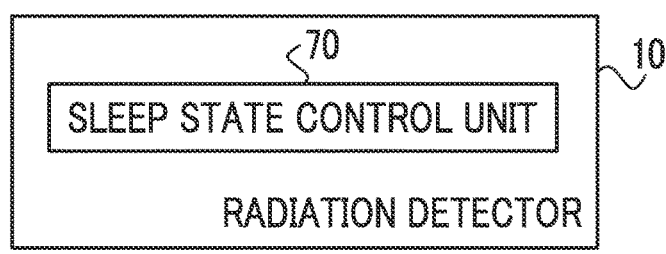

RADIATION DETECTOR AND CONTROL METHOD

CROSS-REFERENCE TO RELATED APPLICATIONS

This application is a continuation application of International Application No. PCT/JP2021/038806, filed Oct. 20, 2021, the disclosure of which is incorporated herein by reference in its entirety. Further, this application claims priority from Japanese Patent Application No. 2020-183114, filed Oct. 30, 2020, the disclosure of which is incorporated herein by reference in their entirety.

TECHNICAL FIELD

The present disclosure relates to a radiation detector and a control method.

RELATED ART

Generally, a radiation detector that generates a radiation image corresponding to radiation transmitted through a subject is known. The capturing of the radiation image is performed by the control of a control device, such as a so-called console. The control device and the radiation detector may be connected by wireless communication.

As a technique for performing connection to a connection destination through wireless communication, for example, JP2016-189968A describes a technique capable of switching whether a radiation detector operates as a master unit or as a slave unit in wireless communication.

In addition, for example, JP2012-100796A describes a technique of searching for an access point of a connection destination in wireless communication through an active scan method and switching the scan method to a passive scan method in a case in which connection to the access point is performed. In the technique described in JP2012-100796A, the passive scan method is not used in a case of searching for the access point of the connection destination so that the security of communication is improved.

SUMMARY

Meanwhile, in a case in which a radiation image generated by a radiation detector is transmitted to an external device, such as a console, it is desired to stably perform wireless communication. However, with the techniques described in JP2016-189968A and JP2012-100796A, wireless communication may not be stably performed. In addition, with the techniques described in JP2016-189968A and JP2012-100796A, security in wireless communication may not be sufficient.

The present disclosure has been made in view of the above circumstances and provides a radiation detector and a control method capable of stably transmitting a radiation image generated by the radiation detector while ensuring the security of wireless communication.

According to a first aspect of the present disclosure, there is provided a radiation detector comprising: a radiation detection unit that generates and outputs a radiation image from an electric charge generated in response to emitted radiation; and a communication unit that operates as a master to perform wireless communication with a slave and that is prevented from being directly connected to a global network, in a case of transmitting the radiation image generated by the radiation detection unit.

With the radiation detector according to a second aspect of the present disclosure, in the radiation detector according to the first aspect, whether the communication unit operates as a master or as a slave to perform wireless communication is set, and in a case in which the master is set, the communication unit is prevented from being directly connected to the global network.

With the radiation detector according to a third aspect of the present disclosure, in the radiation detector according to the second aspect, in a case in which the slave is set, the communication unit is allowed to be directly connected to the global network.

With the radiation detector according to a fourth aspect of the present disclosure, in the radiation detector according to any one of the first to third aspects, at least one processor is further provided, and the processor is configured to, among a first power consumption reduction mode in which power from a power supply is supplied to at least the communication unit and supply of the power from the power supply to a unit except for the communication unit is cut off, and a second power consumption reduction mode in which supply of the power from the power supply to the communication unit and the unit except for the communication unit is cut off, transition to the first power consumption reduction mode in a case in which the communication unit operates as the master.

With the radiation detector according to a fifth aspect of the present disclosure, in the radiation detector according to any one of the first to third aspects, at least one processor is further provided, and the processor is configured to, among a first power consumption reduction mode in which power from a power supply is supplied to at least the communication unit and supply of the power from the power supply to a unit except for the communication unit is cut off, and a second power consumption reduction mode in which supply of the power from the power supply to the communication unit and the unit except for the communication unit is cut off, prohibit transition to the second power consumption reduction mode in a case in which the communication unit operates as the master.

With the radiation detector according to a sixth aspect of the present disclosure, in the radiation detector according to any one of the first to third aspects, at least one processor is further provided, and the processor is configured to prohibit transition to a power consumption reduction mode in which supply of power from a power supply to the communication unit and a unit except for the communication unit is cut off, in a case in which the communication unit operates as the master.

With the radiation detector according to a seventh aspect of the present disclosure, in the radiation detector according to any one of the first to sixth aspects, the communication unit serves as an access point for wireless communication in a case in which the communication unit operates as the master.

In addition, according to an eighth aspect of the present disclosure, there is provided a control method for a radiation detector including a radiation detection unit that generates and outputs a radiation image from an electric charge generated in response to emitted radiation and a communication unit that transmits the radiation image generated by the radiation detection unit, the control method being a method for executing a process comprising preventing the communication unit from being directly connected to the global network in a case in which the communication unit operates as a master to perform wireless communication with a slave.

According to the present disclosure, it is possible to stably transmit a radiation image generated by a radiation detector while ensuring the security of wireless communication.

BRIEF DESCRIPTION OF THE DRAWINGS

FIG. 2 is a block diagram showing an example of a hardware configuration of a radiation detector and a console of an embodiment.

FIG. 3 is a functional block diagram showing an example of a functional configuration of the radiation detector of the embodiment.

DETAILED DESCRIPTION

Hereinafter, embodiments of the present disclosure will be described in detail with reference to the drawings. It should be noted that each embodiment does not limit the present disclosure.

Figure 1:
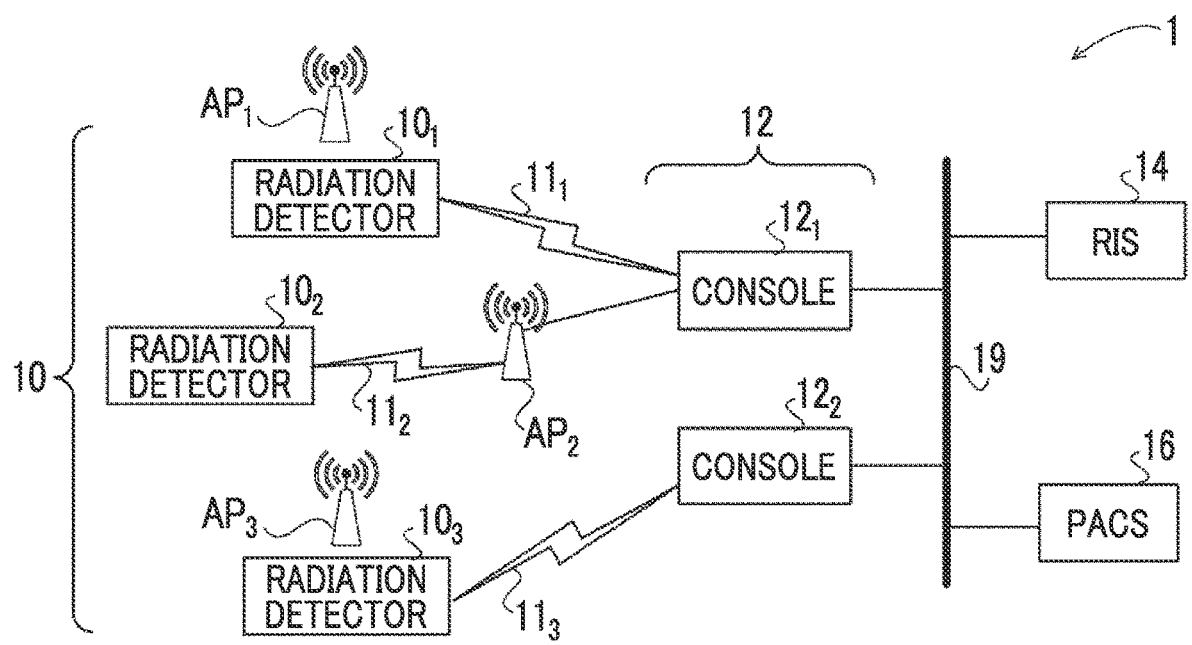
FIG. 1 is a diagram showing an example of a radiography system.

First, a configuration of a radiography system 1 of the present embodiment will be described with reference to FIG. 1. As shown in FIG. 1, the radiography system 1 of the present embodiment includes a plurality of radiation detectors 10 (in FIG. 1, three of $10_1$ to $10_3$), a plurality of consoles 12 (in FIG. 1, two of $12_1$ and $12_2$), a radiology information system (RIS) 14, and a picture archiving and communication system (PACS) 16. In the radiography system 1 of the present embodiment, as shown in FIG. 1, a case in which the plurality of radiation detectors 10 and the plurality of consoles 12 are provided has been described, but the number of each of the radiation detector 10 and the console 12 provided in the radiography system 1 is not limited to the present embodiment. For example, an aspect may be employed in which one may be provided for at least one of the radiation detector 10 or the console 12.

The radiation detector 10 has a function of generating and outputting a radiation image corresponding to emitted radiation. More specifically, the radiation detector 10 has a function of generating and outputting image data representing a radiation image corresponding to radiation emitted from a radiation source (not shown) and transmitted through a subject. The radiation detector 10 of the present embodiment is a so-called flat panel detector (FPD).

The radiation detector 10 of the present embodiment outputs the generated image data representing the radiation image through wireless communication. The radiation detector $10_1$ operates as a master in wireless communication and performs wireless communication with a console $12_1$ operating as a slave via a network $11_1$ which is a local network. Further, in this case, in the radiation detector $10_1$, the radiation detector $10_1$ itself serves as an access point $AP_1$ in wireless communication.

In addition, the radiation detector $10_2$ operates as a slave in wireless communication, is connected to an access point $AP_2$ via a network $11_2$ which is a local network, and performs wireless communication with the console $12_1$ operating as a master via the access point $AP_2$.

In addition, the radiation detector $10_3$ operates as a master in wireless communication and performs wireless communication with a console $12_2$ operating as a slave via a network $11_3$ which is a local network. Further, in this case, in the radiation detector $10_3$, the radiation detector $10_3$ itself serves as an access point $AP_3$ in wireless communication.

The console 12 is connected to the RIS 14 by a global network 19 and has a function of controlling the radiation detector 10 on the basis of an imaging order or the like received from the RIS 14 and controlling the generation of a radiation image performed by the radiation detector 10. In addition, the console 12 is connected to the PACS 16 by the global network 19 and transmits the radiation image generated by the radiation detector 10 to the PACS 16. The communication between the console 12, and the RIS 14 and the PACS 16 may be wireless communication or wired communication.

As an example, the console $12_1$ of the present embodiment is a stationary type console and is installed in, for example, a radiography room. In addition, the console $12_2$ is a mobile type console and is provided in, for example, a medical cart.

FIG. 2 shows a block diagram showing an example of a hardware configuration of the radiation detector 10 and the console 12 of the present embodiment. Since the hardware configurations of the consoles $12_1$ and $12_2$ are substantially the same, the consoles $12_1$ and $12_2$ are collectively referred to as the console 12 and will be described.

As shown in FIG. 2, the console 12 of the present embodiment comprises a control unit 40, a storage unit 42, an I/F unit 44, a display 46, and an input device 48. The control unit 40, the storage unit 42, the I/F unit 44, the display 46, and the input device 48 are connected to each other via a bus 49, such as a system bus or a control bus, such that various types of information can be exchanged.

The control unit 40 of the present embodiment controls the overall operation of the console 12. The control unit 40 comprises a central processing unit (CPU) 40A, a read only memory (ROM) 40B, and a random access memory (RAM) 40C. The ROM 40B stores in advance a program such as an imaging control processing program (not shown) executed by the CPU 40A for controlling the capturing of a radiation image performed by the console 12. The RAM 40C temporarily stores various types of data.

The storage unit 42 stores image data of a radiation image captured by the radiation detector 10, various other types of information, and the like. Specific examples of the storage unit 42 include a hard disk drive (HDD) and a solid state drive (SSD).

The I/F unit 44 performs communication of various types of information including the image data of the radiation image with the radiation detector 10 through wireless communication. In the radiography system 1 of the present embodiment, the console 12 receives the image data of the radiation image captured by the radiation detector 10 from the radiation detector 10 through wireless communication via the I/F unit 44. In addition, the I/F unit 44 performs communication of various types of information with each of the RIS 14 and the PACS 16 via the global network 19.

The display 46 displays various types of information, such as an imaging order related to the capturing of the radiation image performed by the radiation detector 10 and the like, the radiation image captured by the radiation detector 10, and the like. The input device 48 is used for a user to input, for example, instructions and various types of information related to the capturing of the radiation image, such as a setting of communication with the radiation detector 10, a designation of an imaging menu corresponding to the imaging order, and the like. The input device 48 is not particularly limited, and examples thereof include various switches, a touch panel, a touch pen, and a mouse. The display 46 and the input device 48 may be integrated to form a touch panel display.

Further, as shown in FIG. 2, the radiation detector 10 of the present embodiment comprises a display unit 24, an operation button 28, a control unit 30, a storage unit 32, an I/F unit 34, and a radiation detection unit 35. The display unit 24, the operation button 28, the control unit 30, the storage unit 32, the I/F unit 34, and the radiation detection unit 35 are connected to each other via a bus 39, such as a system bus or a control bus, such that various types of information can be exchanged.

The control unit 30 of the present embodiment controls the overall operation of the radiation detector 10. The control unit 30 comprises a CPU 30A, a ROM 30B, and a RAM 30C. A program such as a control program 31 executed by the CPU 30A is stored in the ROM 30B in advance. The RAM 30C temporarily stores various types of data. The CPU 30A of the present embodiment is an example of a "processor" of the present disclosure.

In the radiation detection unit 35, a plurality of pixels that generate a signal electric charge in response to radiation or visible light converted from the radiation by a conversion layer such as a scintillator are arranged, and a function of generating the image data representing the radiation image corresponding to the emitted radiation is provided.

The storage unit 32 stores the image data of the radiation image captured by the radiation detector 10, various other types of information, and the like. Specific examples of the storage unit 32 include an HDD and an SSD. In addition, information for identifying a communication destination of the radiation detector 10 is stored in the storage unit 32 of the present embodiment. Examples of the information for identifying the communication destination include an extended service set identifier (ESSID), a media access control (MAC) address, a communication channel, a communication destination name, a communication method, such as IEEE, and a communication standard.

The I/F unit 34 performs communication of various types of information including the image data of the radiation image with the console 12 through wireless communication. In the radiography system 1 of the present embodiment, the image data of the radiation image generated by the radiation detection unit 35 is transmitted to the console 12 through wireless communication via the I/F unit 34. The I/F unit 34 of the present embodiment is an example of a "communication unit" of the present disclosure.

As shown in FIG. 2, in the I/F unit 34 of the present embodiment, an operation setting 33 indicating whether to operate as a master or operate as a slave in wireless communication is performed. The I/F unit 34 operates as either a master or a slave in wireless communication in accordance with the operation setting 33.

As an example, in the present embodiment, the user operates the radiation detector 10, whereby whether to operate as a master or as a slave in wireless communication is set. For example, as described above, in the present embodiment, since the radiation detector 10 itself serves as an access point in a case in which the radiation detector 10 operates as a master, an aspect may be employed in which the user sets whether or not to make the radiation detector 10 itself function as an access point so that whether to operate as a master or as a slave is set. In a case in which the setting is performed by the user, for example, an aspect may be employed in which the user operates the operation button 28 of the radiation detector 10 to perform the setting, or an aspect may be employed in which the user performs setting from the console 12.

In the present embodiment, in a case in which the radiation detector 10 operates as a master in wireless communication, a communication destination is designated by the console 12 operating as a slave, and the radiation detector 10 and the console 12 are connected to each other on a one-to-one basis. In the console 12, for example, information indicating the radiation detector 10 capable of wireless communication with the console 12 may be displayed on the display 46, and the user may select information indicating the radiation detector 10 operating as a master from the displayed information by using the input device 48, whereby the communication destination may be designated. In a case in which the communication destination is designated in this way, the control unit 40 of the console 12 performs control to enable communication only with the designated radiation detector 10 among the plurality of radiation detectors 10. As described above, in a case in which the radiation detector 10 operates as a master and functions as an access point, the radiation detector 10 performs wireless communication only with one console 12 operating as a slave via the local network. Meanwhile, the radiation detector 10 is not directly connected to the global network. As an example, in the present embodiment, in a case in which the operation setting 33 is set as a master, the I/F unit 34 does not perform connection to the global network to be in a state in which the I/F unit 34 is not directly connected to the global network. In other words, the I/F unit 34 is subject to any restrictions on the connection to the global network. It should be noted that the present disclosure is not limited to the present embodiment, and an aspect may be employed in which, for example, in a case in which the user gives an instruction of the connection to the global network, processing of rejecting the direct connection to the global network is performed.

The display unit 24 displays various types of information related to the capturing of the radiation image performed by the radiation detection unit 35 and the like. The operation button 28 is used for a user to input an instruction or the like related to the capturing of the radiation image or the like.

Further, FIG. 3 shows a functional block diagram of an example of a functional configuration of the radiation detector 10 of the present embodiment. As shown in FIG. 3, the radiation detector 10 comprises a sleep state control unit 70. As an example, in the radiation detector 10 of the present embodiment, the CPU 30A of the control unit 30 executes the control program 31 stored in the ROM 30B, whereby the CPU 30A functions as the sleep state control unit 70.

The sleep state control unit 70 has a function of performing control regarding transition to a sleep mode for reducing the power consumption of the radiation detector 10. In the radiation detector 10 of the present embodiment, there are two types of sleep modes for reducing the power consumption, that is, a first power consumption reduction mode and a second power consumption reduction mode. Hereinafter, the first power consumption reduction mode and the second power consumption reduction mode may be collectively referred to as a sleep mode.

In the first power consumption reduction mode, a state in which power from a power supply is supplied to at least the I/F unit 34 is maintained, and power from the power supply is in a state of being cut off for at least a part of the other parts such as the radiation detection unit 35. On the other hand, in the second power consumption reduction mode, in addition to the parts in which power from the power supply is cut off in the first power consumption reduction mode, the I/F unit 34 is also put into a state in which the supply of power from the power supply is cut off. Therefore, the power consumption is further reduced in the second power consumption reduction mode than in the first power consumption reduction mode. However, in a case of the second power consumption reduction mode, the communication by the I/F unit 34 cannot be performed as it is because the supply of power from the power supply is also cut off for the I/F unit 34. In that respect, in a case in which the I/F unit 34 operates as a master, the sleep state control unit 70 of the present embodiment performs control to prohibit the transition to the second power consumption reduction mode.

Next, the operation of the radiation detector 10 of the present embodiment in the transition to the sleep state will be described with reference to the drawing.

Figure 4:
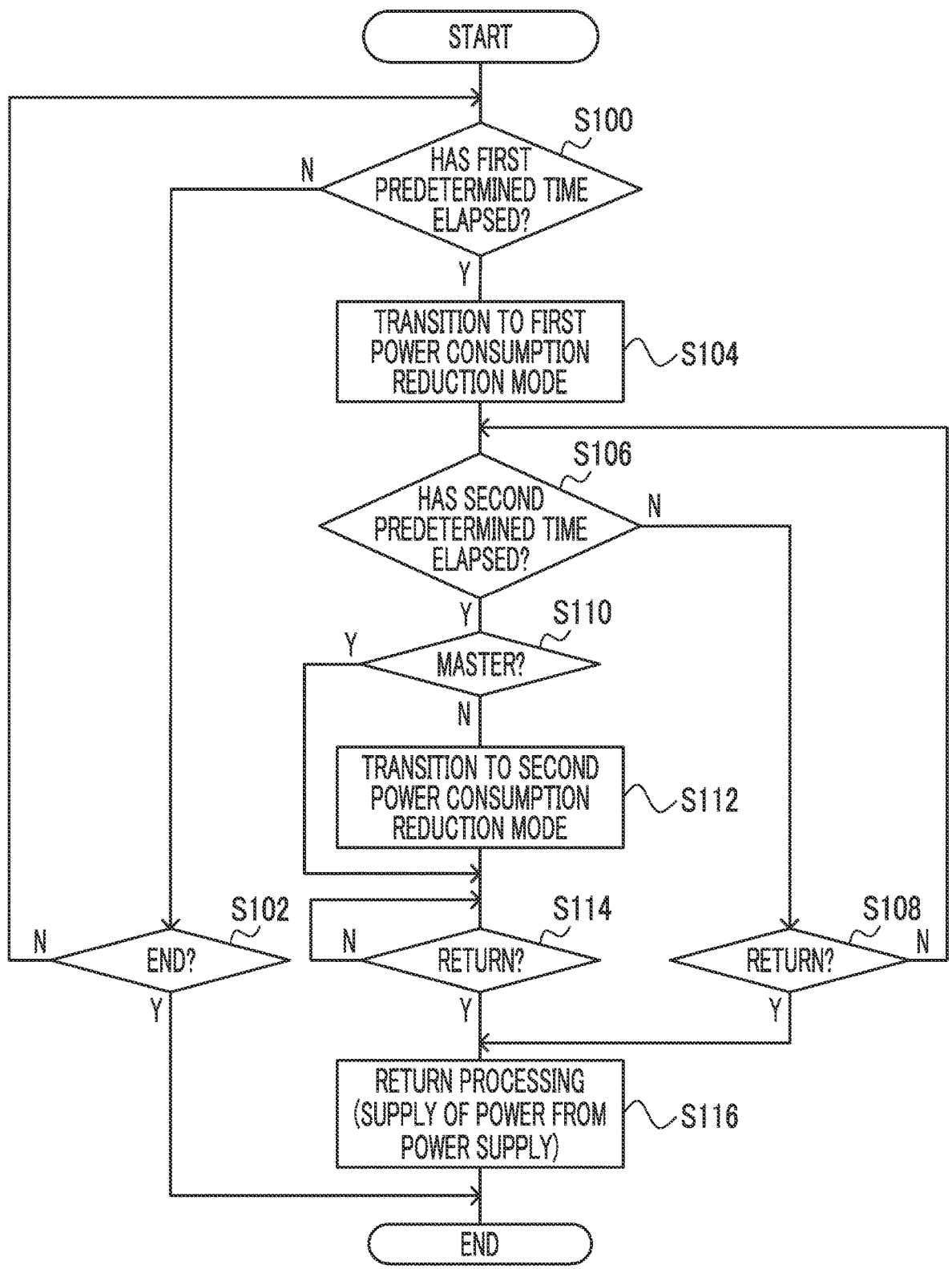
FIG. 4 is a flowchart showing an example of a flow of sleep state control processing in the radiation detector of the embodiment.

In the radiation detector 10 of the present embodiment, the CPU 30A of the control unit 30 executes the control program 31 stored in the ROM 30B to execute sleep state control processing shown as an example in FIG. 4. FIG. 4 shows a flowchart showing an example of a flow of the sleep state control processing executed in the radiation detector 10 of the present embodiment. The sleep state control processing shown in FIG. 4 is executed, for example, in a case in which the radiation detector 10 does not perform any operation, such as an operation of capturing a radiation image, and the I/F unit 34 does not communicate with an external device, such as a console.

In step S100, the sleep state control unit 70 determines whether or not a first predetermined time has elapsed. As an example, in the present embodiment, in a case in which a time during which the radiation detector 10 does not perform any operation, such as an operation of capturing a radiation image, and the I/F unit 34 does not communicate with an external device, such as a console 12, is continued for the first predetermined time or longer, the mode transitions to the first power consumption reduction mode. Therefore, in this step, the sleep state control unit 70 determines whether or not the first predetermined time has elapsed after the radiation detector 10 does not perform any operation, such as an operation of capturing a radiation image, and the I/F unit 34 does not communicate with an external device, such as a console.

In a case in which the first predetermined time has not elapsed, the determination in step S100 is made as a negative determination, and the process transitions to step S102. In step S102, the sleep state control unit 70 determines whether or not to end this sleep state control processing. In a case of at least one of a case in which the radiation detector 10 performs any operation, such as an operation of capturing a radiation image, or a case in which the I/F unit 34 communicates with an external device, such as the console, the determination in step S102 is made as an affirmative determination, and this sleep processing ends. On the other hand, in a case in which the radiation detector 10 does not perform any operation, such as an operation of capturing a radiation image, and the I/F unit 34 does not communicate with an external device, such as a console, the determination in step S102 is made as a negative determination, and the process returns to step S100.

On the other hand, in a case in which the first predetermined time has elapsed after the radiation detector 10 does not perform any operation, such as an operation of capturing a radiation image, and the I/F unit 34 does not communicate with an external device, such as a console, the determination in step S100 is made as an affirmative determination, and the process transitions to step S104.

In step S104, the sleep state control unit 70 transitions to the first power consumption reduction mode. In the first power consumption reduction mode, as described above, a state in which power from the power supply is supplied to the I/F unit 34 is maintained, and power from the power supply is in a state of being cut off for at least a part of the other parts such as the radiation detection unit 35.

In the next step S106, the sleep state control unit 70 determines whether or not a second predetermined time has elapsed after the transition to the first power consumption reduction mode. In a case in which the second predetermined time has not yet elapsed after the transition to the first power consumption reduction mode, the determination in step S106 is made as a negative determination, and the process transitions to step S108.

In step S108, the sleep state control unit 70 determines whether or not to return from the first power consumption reduction mode. As an example, the sleep state control unit 70 of the present embodiment returns from the sleep mode in a case in which an instruction to return from the sleep mode is received from the user. The return instruction from the user is given, for example, in a case in which the user operates the operation button 28 of the radiation detector 10. In a case in which the sleep state control unit 70 receives the return instruction, the determination in step S108 is made as an affirmative determination, and the process transitions to step S116. On the other hand, in a case in which the sleep state control unit 70 has not received the return instruction, the determination in step S108 is made as a negative determination, and the process returns to step S106.

On the other hand, in a case in which the second predetermined time has elapsed after the transition to the first power consumption reduction mode, the determination in step S106 is made as an affirmative determination, and the process transitions to step S110.

In step S110, the sleep state control unit 70 determines whether or not the I/F unit 34 operates as a master. Specifically, the sleep state control unit 70 determines that the I/F unit 34 operates as a master by referring to the operation setting 33 in a case in which operating as a master is set, the determination in step S110 is made as an affirmative determination, and the process transitions to step S114. On the other hand, in a case in which operating as a slave is set in the operation setting 33, the determination in step S110 is made as a negative determination, and the process transitions to step S112.

In step S112, the sleep state control unit 70 transitions to the second power consumption reduction mode. In the second power consumption reduction mode, as described above, the supply of power from the power supply to the I/F unit 34 is also cut off from the state of the first power consumption reduction mode.

In the next step S114, the sleep state control unit 70 determines whether or not to return from the second power consumption reduction mode. As an example, in the present embodiment, the return condition for returning from the second power consumption reduction mode is the same as the return condition for returning from the first power consumption reduction mode described in step S108. That is, the determination in step S114 is made as a negative determination until the sleep state control unit 70 receives the return instruction, and in a case in which the sleep state control unit 70 receives the return instruction, the determination in step S114 is made as an affirmative determination, and the process transitions to step S116.

In step S116, the sleep state control unit 70 performs return processing for returning from the first power consumption reduction mode or the second power consumption reduction mode. Specifically, processing for supplying power from the power supply to each unit in which the supply of power from the power supply is cut off is performed. When the processing of step S116 ends, the sleep state control processing also ends.

As described above, in the present embodiment, in a case in which the radiation detector 10 operates as a master and functions as an access point, the transition to the second power consumption reduction mode is prohibited. In other words, in a case in which the radiation detector 10 operates as a master and functions as an access point, the sleep state in which the supply of power from the power supply to the I/F unit 34 is cut off does not occur. Accordingly, the radiation detector 10 can appropriately function as a master in wireless communication.

As described above, the radiation detector 10 of the above-described embodiment comprises the radiation detection unit 35 that generates and outputs a radiation image from an electric charge generated in response to the emitted radiation; and the I/F unit 34 that operates as a master to perform wireless communication with a slave and that is prevented from being directly connected to the global network, in a case of transmitting the radiation image generated by the radiation detection unit 35.

As described above, in a case in which the radiation detector 10 of the above-described embodiment operates as a master in wireless communication, direct connection to the global network cannot be performed, so that the security in wireless communication is ensured. In addition, as described above, by connecting the radiation detector 10 and the console 12 to each other on a one-to-one basis, it is possible to more stably perform communication between the radiation detector 10 and the console 12. Accordingly, with the radiation detector 10 of the above-described embodiment, the radiation image generated by the radiation detection unit 35 can be stably transmitted while ensuring the security of wireless communication.

In particular, in a case of the mobile type console 12, such as the console $12_2$, imaging is often performed using one radiation detector 10 for the console 12. Therefore, in the mobile type console 12, it is preferable to operate the radiation detector 10 as a master.

In the above-described embodiment, two types of the consoles 12, that is, a stationary type and a mobile type, have been described, but the type of the console 12 is not limited to these.

In addition, in the above-described embodiment, an aspect has been described in which the radiation detector 10 has a function of an access point in a case in which the radiation detector 10 serves as a master in wireless communication, but the present disclosure is not limited to the present embodiment. In a case in which the radiation detector 10 serves as a master in wireless communication, the radiation detector 10 need only have a function as a host in wireless communication. For example, the radiation detector 10 may be a host in a router or other communication.

Further, in the above-described embodiment, the timing of the transition to the sleep mode is determined according to the time during which the radiation detector 10 does not perform any operation, such as an operation of capturing a radiation image, and the I/F unit 34 does not communicate with an external device, such as a console. However, the timing of the transition to the sleep mode is not limited to the present embodiment. For example, a case in which the sleep state control unit 70 receives an instruction to transition to the sleep mode from the user may be set as the timing of the transition to the sleep mode. The transition instruction from the user need only be given, for example, in a case in which the user operates the operation button 28 of the radiation detector 10.

In addition, in the above-described embodiment, although an aspect has been described in which the mode transitions to the second power consumption reduction mode after the transition to the first power consumption reduction mode, the present disclosure is not limited to the present embodiment, and an aspect may be employed in which the mode directly transitions to the second power consumption reduction mode without passing through the first power consumption reduction mode. For example, in a case of the transition to the sleep mode when the transition instruction from the user is received as described above, an aspect may be employed in which the mode transitions to the first power consumption reduction mode when the user lightly presses the operation button 28 and the mode transitions to the second power consumption reduction mode when the user presses and holds the operation button 28.

In addition, in the above-described embodiment, an aspect has been described in which the timing of returning from the sleep mode is set as the timing of receiving the return instruction, but the timing of returning from the sleep mode is not limited to the present embodiment. For example, a movement detection sensor, such as a gyro sensor, may be provided in the radiation detector 10, and a timing at which the movement detection sensor detects that the radiation detector 10 has moved may be set as a timing of returning from the sleep mode.

Further, in the above-described embodiment, for example, as a hardware structure of a processing unit that executes various types of processing, such as the sleep state control unit 70, the following various processors can be used. The above-described various processors include, for example, a programmable logic device (PLD) which is a processor having a changeable circuit configuration after manufacture, such as a field programmable gate array (FPGA), and a dedicated electrical circuit which is a processor having a dedicated circuit configuration designed for executing specific processing, such as an application specific integrated circuit (ASIC), in addition to the CPU which is a general-purpose processor that executes software (programs) to function as various processing units, as described above.

One processing unit may be composed of one of these various processors or a combination of two or more processors of the same type or different types (for example, a combination of a plurality of FPGAs or a combination of a CPU and an FPGA). Alternatively, a plurality of processing units may be composed of one processor.

A first example in which a plurality of processing units are composed of one processor is an aspect in which one or more CPUs and software are combined to constitute one processor and the processor functions as the plurality of processing units, as typified by a computer, such as a client and a server. A second example is an aspect in which a processor that realizes functions of an entire system including a plurality of processing units with one integrated circuit (IC) chip is used, as typified by a system on chip (SoC) or the like. As described above, various processing units are composed of one or more of the above-described various processors as the hardware structure.

Further, as the hardware structure of these various processors, more specifically, an electrical circuit (circuitry) in which circuit elements, such as semiconductor elements, are combined can be used.

Further, in each of the above-described embodiments, an aspect has been described in which the control program 31 is stored (installed) in the storage unit 32 in advance, but the present disclosure is not limited thereto. The control program 31 may be provided in an aspect of being recorded on a recording medium, such as a compact disc read only memory (CD-ROM), a digital versatile disc read only memory (DVD-ROM), and a universal serial bus (USB) memory. Alternatively, an aspect may be employed in which the control program 31 is downloaded from an external device via the network.

The disclosure of Japanese patent application 2020-183114 filed on Oct. 30, 2020 is incorporated herein by reference in its entirety.

All documents, patent applications, and technical standards described in the present specification are incorporated herein by reference to the same extent as in a case of being specifically and individually noted that individual documents, patent applications, and technical standards are incorporated by reference.

What is claimed is:

1. A radiation detector comprising:
   a detector that generates and outputs a radiation image from an electric charge generated in response to emitted radiation; and
   a communicator that transmits the radiation image generated by the detector and has an operational setting that can be switched between a first state in which the radiation detector operates as a master to perform, via the communicator, wireless communication with a slave that is external to the radiation detector and a second state in which the radiation detector operates as a slave to perform, via the communicator, wireless communication with a master that is external to the radiation detector, and
   (A) in a case in which the operational setting of the communicator is in the first state, the communicator is prevented from being directly connected to a global network, and
   (B) in a case in which the operational setting of the communicator is in the second state, the communicator is allowed to be directly connected to the global network.

2. The radiation detector according to claim 1, further comprising:
   at least one processor,
   wherein the processor is configured to,
      among a first power consumption reduction mode in which power from a power supply is supplied to at least the communicator and supply of the power from the power supply to a part of the radiation detector other than the communicator is cut off, and
      a second power consumption reduction mode in which supply of the power from the power supply to the communicator and the part of the radiation detector other than the communicator is cut off,
      transition to the first power consumption reduction mode in a case in which the communicator operates as the master.

3. The radiation detector according to claim 1, further comprising:
   at least one processor,
   wherein the processor is configured to,
      among a first power consumption reduction mode in which power from a power supply is supplied to at least the communicator and supply of the power from the power supply to a part of the radiation detector other than the communicator is cut off, and
      a second power consumption reduction mode in which supply of the power from the power supply to the communicator and the part of the radiation detector other than the communicator is cut off,
      prohibit transition to the second power consumption reduction mode in a case in which the communicator operates as the master.

4. The radiation detector according to claim 1, further comprising:
   at least one processor,
   wherein the processor is configured to
      prohibit transition to a power consumption reduction mode in which supply of power from a power supply to the communicator and a part of the radiation detector other than the communicator is cut off, in a case in which the communicator operates as the master.

5. The radiation detector according to claim 1,
   wherein the communicator serves as an access point for wireless communication in a case in which the communicator operates as the master.

6. A control method for a radiation detector including a detector that generates and outputs a radiation image from an electric charge generated in response to emitted radiation and a communicator that transmits the radiation image generated by the detector and has an operational setting that can be switched between a first state in which the radiation detector operates as a master to perform, via the communicator, wireless communication with a slave that is external to the radiation detector, and a second state in which the radiation detector operates as a slave to perform, via the communicator, wireless communication with a master that is external to the radiation detector, the control method comprising:
   (A) in a case in which the operational setting of the communicator is in the first state, preventing the communicator from being directly connected to a global network; and
   (B) in a case in which the operational setting of communicator is in the second state, allowing the communicator to be directly connected to the global network.

* * * * *